United States Patent [19]

Sandler et al.

[11] 4,323,861

[45] Apr. 6, 1982

[54] OSCILLATOR CIRCUIT FOR CONTROLLING THE POWER LEVEL OF A MICROWAVE OVEN

[75] Inventors: Louis M. Sandler, N. Reading; Walter R. Spofford, Bedford, both of Mass.; Charles E. Scott, Noblesville, Ind.

[73] Assignee: Emhart Industries, Inc., Indianapolis, Ind.

[21] Appl. No.: 25,217

[22] Filed: Mar. 29, 1979

Related U.S. Application Data

[62] Division of Ser. No. 865,309, Dec. 28, 1977.

[51] Int. Cl.³ ........................ H03K 3/023; H05B 6/68
[52] U.S. Cl. ........................................ 331/111; 331/75; 331/143; 331/173; 219/10.55 B
[58] Field of Search .................... 331/111, 113 R, 143, 331/144, 145, 172, 173, 75, 108 D; 219/10.55 B

[56] References Cited

U.S. PATENT DOCUMENTS

| | | | |
|---|---|---|---|
| 3,611,204 | 10/1971 | Boenning et al. | 331/111 |
| 3,612,901 | 10/1971 | Loe | 331/108 D X |
| 3,713,046 | 1/1973 | Wong et al. | 331/111 |
| 3,939,319 | 2/1976 | Tamano et al. | 219/10.55 B |
| 3,943,317 | 3/1976 | Nagamoto | 219/10.55 B |
| 4,009,359 | 2/1977 | Tallmadge et al. | 219/10.55 B |
| 4,012,617 | 3/1977 | Burke et al. | 219/10.55 B |
| 4,023,004 | 5/1977 | Burke | 219/10.55 B |
| 4,038,611 | 7/1977 | Greig | 331/108 D |
| 4,188,593 | 2/1980 | Kaplan | 331/108 D |
| 4,205,279 | 5/1980 | Beutler | 331/111 |

OTHER PUBLICATIONS

Graeme, Applications of Operational Amplifiers, 1973, pp. 164–165, TK 7871.58.06G7.

*Primary Examiner*—Siegfried H. Grimm
*Attorney, Agent, or Firm*—Robert F. Meyer; David W. Gomes

[57] ABSTRACT

An oscillator circuit having a variable duty cycle for controlling the power level of a microwave oven provides an adjustable RC time constant circuit including a capacitance branch and a resistance branch and coupling means therebetween, the resistance branch including a pair of alternately selectable current paths for the charging and discharging of the capacitance branch, the coupling means including semiconductor switch means for selecting and coupling either of the current paths to the capacitance branch for changing the charging and discharging of the capacitance branch in accordance with the selected current path, and one of the current paths including a pair of parallel connected portions with each of the parallel portions having a diode connected therein for controlling the direction of current flow, the diodes being connected with opposite respective polarities for allowing current flow only in opposite directions in the respective portions, the one current path further including a potentiometer having a pair of fixed terminals each of which is connected to a separate parallel portion and a variable wiper terminal connected to the first coupling means for simultaneously inversely varying the resistance in the parallel portions.

5 Claims, 2 Drawing Figures

OSCILLATOR CIRCUIT FOR CONTROLLING THE POWER LEVEL OF A MICROWAVE OVEN

This is a division, of application Ser. No. 865,309, filed Dec. 28, 1977.

BACKGROUND OF THE INVENTION

1. Field of the Invention

The present invention relates to systems for controlling the power applied to a load and the temperature within a medium being increased or decreased by the load and more particularly is disclosed as it would be adapted to control appliances and the like such as a microwave oven.

Generally speaking, the control system of the present invention includes a variable power and temperature control circuit which utilizes a unique oscillator circuit to provide various levels of power to the microwave oven magnetron in response to both user selectivity and the temperature being sensed.

2. Description of the Prior Art

In those prior art control systems which allow the user of a microwave oven to select a desired power level to be applied to the oven magnetron, the variable power source usually includes an oscillator circuit having a variable period which is a function of the means for selecting the desired power level. Most of these prior art variable power sources apply power to the magnetron at the level desired and completely deactivate the magnetron either when a time period has expired or when a desired temperature is reached. However, in a microwave oven it is many times desirable after the food has been cooked that the oven keep the food warm until the user can either remove the food or otherwise reprogram the oven.

As a result of the disadvantages of prior art variable power and/or temperature control systems described above, such control systems are expensive and many times not as reliable as they could be. By improving upon the design of these older systems the cost can be reduced while at the same time increasing reliability and performance.

SUMMARY OF THE INVENTION

Accordingly, the present invention includes an oscillator circuit having a variable duty cycle for controlling the power level of a microwave oven comprising, a voltage comparator, an adjustable RC time constant circuit including a capacitance branch and a resistance branch and first coupling means therebetween also connected to one input of the comparator, a reference voltage source coupled to another input of the comparator, second coupling means for coupling the output of the comparator to the RC time constant circuit for causing the charging and discharging of the capacitance branch in response to the comparator output and thereby the oscillation of the output, means for controlling the heating power of a microwave oven in response to the duty cycle of the comparator output oscillations, the resistance branch including a pair of alternately selectable current paths for the charging and discharging of the capacitance branch, the first coupling means including semiconductor switch means for selecting and coupling either of the current paths to the capacitance branch in accordance with the selected current path, and one of the current paths including a pair of parallel connected portions with each of the parallel portions having a diode connected therein for controlling the direction of current flow, the diodes being connected with opposite respective polarities for allowing current flow only in opposite directions in the respective portions, the one current path further including a potentiometer having a pair of fixed terminals each of which is connected to a separate portion and a variable wiper terminal connected to the first coupling means for simultaneously inversely varying the resistance in the parallel portions, the potentiometer thereby providing for variation of the cooking power of the microwave oven by control of the duty cycle of the comparator output.

DESCRIPTION OF THE PREFERRED EMBODIMENT

Figure 1A:
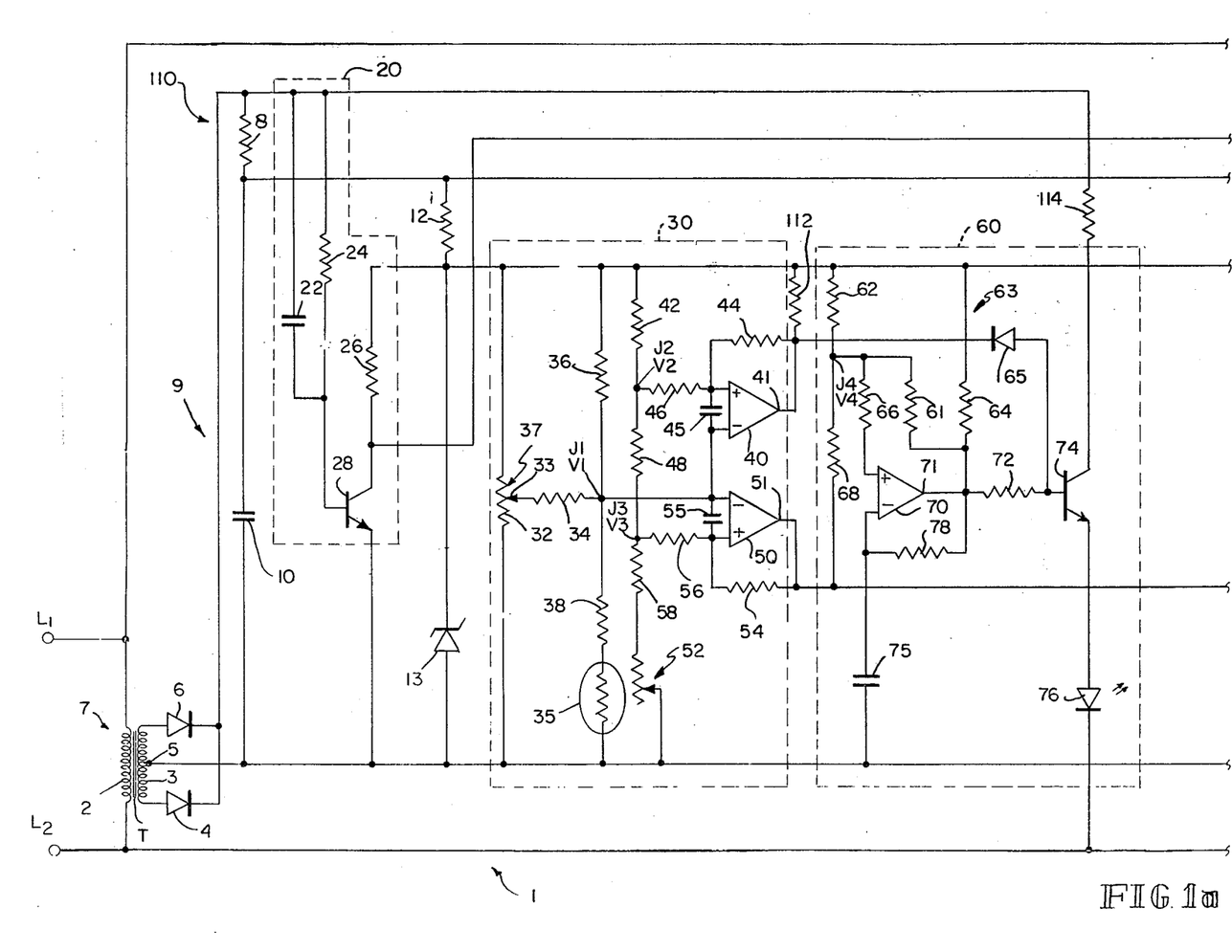
FIGS. 1a and 1b in combination are a schematic illustration of an embodiment of the present invention.
Figure 1B:
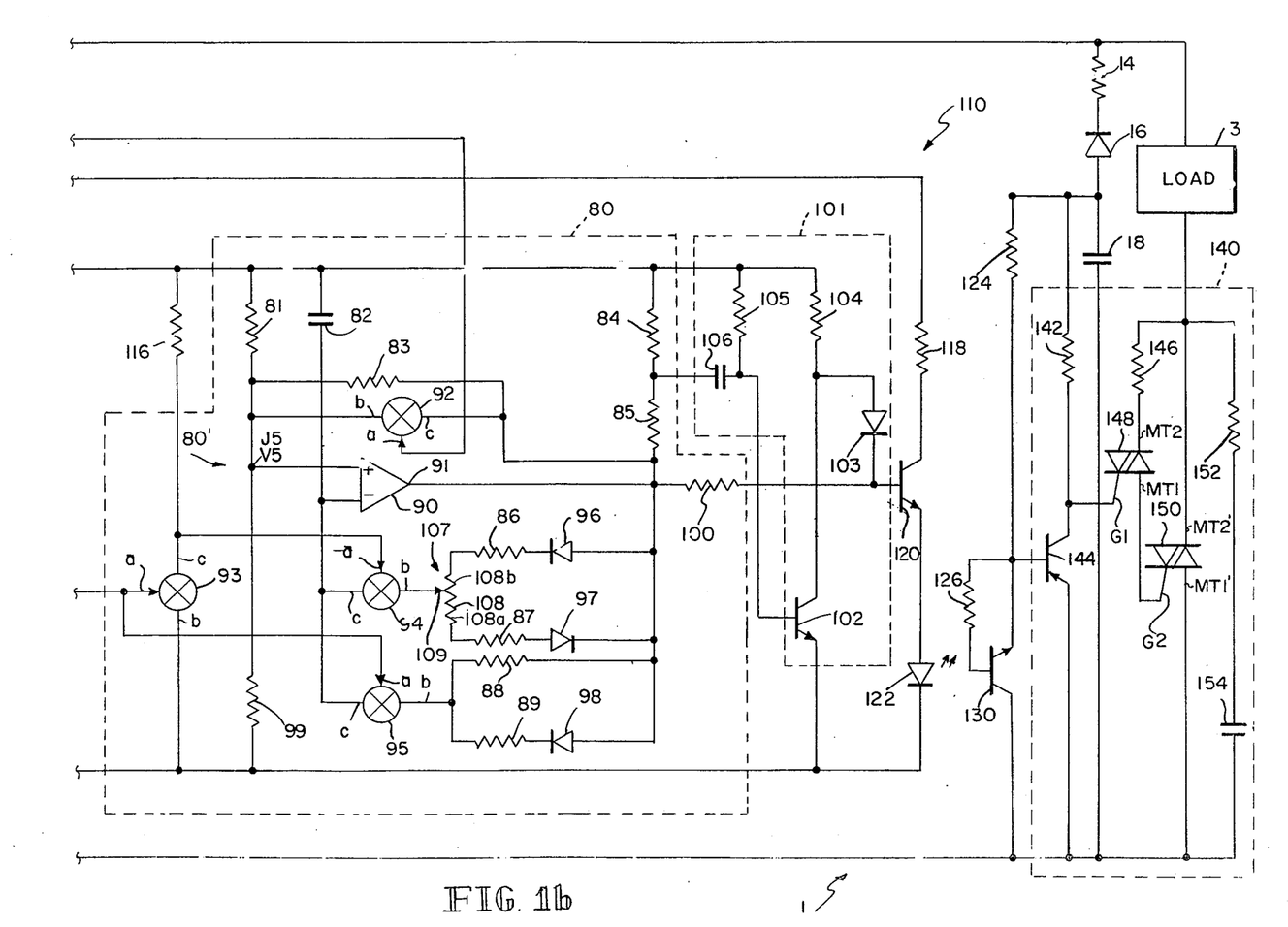

Illustrated in FIGS. 1a and 1b is the preferred embodiment of our invention which has been presented in an electrical schematic form using conventional symbols for known component elements. For the purpose of disclosing our invention, the preferred embodiment will be described with respect to its adaptation to a microwave oven. However, it will be understood by those skilled in the art after reading the description of our invention provided hereinafter that it and/or various parts of it may be adapted to control other appliances and the like of the type which include a means operable at at least one power level for increasing or decreasing the temperature of a medium and a means for detecting a selectable temperature within the medium.

Referring now to FIGS. 1a and 1b there is shown a variable power and temperature control system 1 for controlling a load 3 which in the preferred embodiment is the magnetron of a microwave oven which when activated heats a medium within the oven cooking chamber. A source of A.C. power, such as 120 volts A.C. RMS 60 hertz (not shown), may be connected directly or indirectly through ancillary circuits and switches found in conventional microwave ovens, to the input lines L1 and L2 of the control system 1. An isolted low voltage A.C. power supply 7 is electrically coupled across lines L1 and L2 and includes a transformer T having a primary winding 2, a secondary winding 3, and a center tap 5 in the secondary winding 3. Electrically coupled to low voltage A.C. power supply 7 is a variable power and temperature control circuit 110. The secondary winding 3 of transformer T has one side electrically coupled to the anode of a diode 6 and the other side electrically coupled to the anode of a diode 4 which in combination provide full wave rectification of the low voltage A.C. power produced by power supply 7. The cathodes of diodes 4 and 6 are commonly electrically coupled to a capacitor 10 through a resistor 8 to filter the rectified signal thereby providing a relatively smooth D.C. voltage waveform. In combination, diodes 4 and 6, resistor 8 and capacitor 10 form a conventional D.C. power supply 9. A zener diode 13 electrically coupled in parallel with capacitor 10 is biased by resistor 12 to provide regulated D.C. voltage. The center tap 5 in secondary winding 3 establishes a reference point for the D.C. voltages and therefore may be considered as equivalent to ground potential for the control circuit 110.

In a microwave oven, load 3 will include in addition to a magnetron (not shown), a high voltage transformer (not shown) for stepping up the A.C. line voltages to those levels typically required for the operation of the magnetron. When the high voltage transformer is "on" it is operated very close to core saturation and the core flux will vary from $-B$ MAX. to $+B$ MAX. during each complete half-cycle of the A.C. line voltage. When switching the high voltage transformer "on" from an "off" state the core flux B will start from its residual value which will be near zero and can only change by $\pm B$ MAX before saturation will occur. If saturation does occur, the core inductance of the transformer will become very small and the current through the primary winding will rise sharply being limited only by any resistance in the A.C. line and the primary winding of the high voltage transformer. These high currents are annoyingly audible, producing a loud "thump", and are capable of destroying associated control circuitry and/or blowing circuit breakers. In order to assure that core saturation of the high voltage transformer does not occur during the initial turn-on of load 3 it is desirable to have power applied to the transformer-coupled load 3 at approximately the mid-point or crest of a half-cycle of the A.C. line voltage waveform thereby creating a net flux change of $\pm B$ MAX and avoiding transformer saturation. Either polarity of the initial half-cycle of the A.C. line voltage may be utilized to achieve the desired result. Many microwave ovens use this approach to avoid core saturation when the transformer coupled magnetron (load 3) is activated; however, conventional circuits used to achieve this result require complex logic arrangements to assure activation of the transformer coupled load 3 only at the mid-point or crest of a half-cycle and are otherwise sensitive to values of the various circuit components.

To overcome the disadvantages of these conventional peak detectors or synchronizers, as they may be termed, our variable power and temperature control circuit 110 includes a peak detector 20 for crest firing with reduced sensitivity to component value variations and, by providing a brief time or "window" near the crest of each half-cycle when the load 3 may be activated without core saturation, simplifies the logic required to assure activation of the load 3 at the proper time i.e. at the crest of a half-cycle of the A.C. line voltage. Peak detector 20 as shown in FIG. 1a includes a bipolar semiconductor switching device 28 which in the preferred embodiment is an NPN transistor having its emitter electrically coupled to center tap 5 of transformer T, its collector electrically coupled through a resistor 26 to the regulated D.C. voltage and electrically coupled to an oscillator 80 having means for varying the quantity of power being applied to load 3, and its base electrically coupled through the parallel combination of a resistor 24 and capacitor 22 directly to the cathodes of diodes 6 and 4 which as previously indicated form a full wave rectifier. Peak detector 20 detects the crest of each half-cycle of the A.C. line voltage.

In operation, the base-emitter junction of bipolar semiconductor switching device 28 in combination with at least one of the diodes 6 or 4 acts as a rectifier which charges capacitor 22 to substantially the peak of the voltage provided by low voltage power supply 7. The time constant associated with the RC network of resistor 24 and capacitor 22 is very long; therefore when diodes 6 and 4 are nonconducting following a peak of the A.C. line voltage, capacitor 22 will discharge very slowly. As soon as the A.C. voltage from power supply 7 exceeds the voltage of capacitor 22 the base-emitter junction of switching device 28 will again conduct and therefore recharge capacitor 22 to the voltage of power supply 7. Since capacitor 22 discharges slowly from a value substantially equal to the voltage of power supply 7, the point where A.C. voltage of power supply 7 exceeds the capacitor 22 voltage will be very near the peak of the A.C. line voltage. The base-emitter junction of switching device 28 will discontinue conducting when the magnitude of the voltage of power supply 7 decreases at a faster rate after reaching its peak than the capacitor 22 discharges. Again the base-emitter junction of switching device 28 will discontinue conducting very near the peak of the A.C. line voltage because of the slow discharge rate of capacitor 22. Accordingly, for a brief time before, at, and after the peak of the A.C. line voltage a pulse of current to recharge capacitor 22 will pass through the base of bipolar semiconductor switching device 28 which causes a simultaneous pulse of current to pass through the collector of switching device 28 which is large enough to saturate the switching device 28. A "window" of time extending from just before to just after the peak of the A.C. line voltage is formed during which power will be applied to the load 3 in a manner which will be described later in more detail. It should be noted that in order to create this "window" of time during which power may be applied to load 3, the RC time constant derived from capacitor 22 and resistor 24 must be substantially greater than the period of the A.C. line voltage. As long as this condition exists specific values for the components of peak detector 20 are not critical with respect to activating the load 3 at the crest of the A.C. line voltage.

Referring to FIG. 1a there is further included within our variable power and temperature control circuit 110 a variable temperature sensing circuit 30 for sensing at least two temperatures within the medium being heated by load 3 having means 37 for selecting desired temperatures to be sensed and means 40 and 50 for detecting the two sensed temperatures. Variable temperature sensing circuit 30 senses the temperature in the medium when such temperature is 5° F. below the temperature selected to be sensed by selecting means 37 ($T_{sp-5}$) providing a signal at the output 41 of detecting means 40 and senses the temperature in the medium when such temperature reaches the temperature selected to be sensed by selecting means 37 ($T_{sp}$) providing a signal at the output 51 of detecting means 50. Variable temperature sensing circuit 30 includes as its temperature sensing element a thermistor 35 electrically coupled in series with a linearization resistor 38 and a resistor 36 which assists in establishing a bias current through thermistor 35. In fact, variable temperature sensing circuit 30 detects the temperature $T_p$ of thermistor 35 when the thermistor 35 is placed inside the medium being heated by load 3. Variable temperature sensing circuit 30 further includes a potentiometer 32 electrically coupled to the regulated D.C. voltage; potentiometer 32 having a variable wiper 33 which in combination comprise means 37 for selecting a desired set point temperature $T_{sp}$ to be sensed by thermistor 35; a resistor 34 having one side electrically coupled to a junction J1 coupling resistor 36 to linearization resistor 38 and another side electrically coupled to the variable wiper 33 of potentiometer 32; resistors 42, 48, 52 and 58 forming a voltage divider network across the regulated D.C. voltage; a first conventional voltage comparator 50 having a negative input denoted by a minus — sign electrically coupled to junction J1 and a positive input denoted by a plus + sign electrically coupled through a resistor 56 to a junction J3, coupling resistors 48 and 58, an output 51, and a reference threshold voltage V3 appearing a junction J3; and a second conventional voltage comparator 40 having a negative input again denoted by a minus − sign electrically coupled to junction J1 and a positive input again denoted by a plus + sign electrically coupled through a resistor 46 to a junction J2 coupling resistors 42 and 48, an output 41, and a reference threshold voltage V2 appearing at junction J2. Reference threshold voltages V3 and V2 with hysteresis corresponding to several degrees Fahrenheit (F), are established for set point temperature $T_{sp}$ and temperature $T_{sp-5}$ which is 5° F. below the set point temperature $T_{sp}$ respectively by resistors 42, 44, 46, 48, 54, 56, and 58. Variable resistor 52 provides calibration adjustment to properly establish reference threshold voltages V3 and V2. Capacitors 45 and 55 electrically coupled across the negative and positive inputs of comparators 40 and 50 respectively prevent spurious radiation from microwave signals produced by the magnetron from affecting the reference threshold voltages V3 and V2. Resistor 34 should have a resistance value which is significantly greater than the resistance value of the potentiometer 32 to minimize loading of the potentiometer 32. Voltage comparators 40 and 50 may be any conventional voltage comparator circuits. Since two additional voltage comparators are utilized in our variable power and temperature control circuit 110 we have found it advantageous to utilize an integrated circuit package containing four voltage comparators such as the LM139 series of quad comparator integrated circuit packages manufactured by National Semiconductor.

A basic analysis for understanding the operation of a variable temperature sensing circuit 30 is disclosed by Walter R. Spofford in his U.S. Pat. No. 4,148,220, issued Apr. 10, 1979 and entitled "Linearization Means and Method For a Thermistor Temperature Sensing System", and we therefore, by referencing such copending application, hereby incorporate it in our present disclosure. In general, when the temperature $T_p$ of the thermistor 35 equals $T_{sp}$ the voltage V1 at junction J1 will substantially equal the reference threshold voltage V3 for comparator 50. Since the reference threshold voltage V3 is substantially constant, comparator 50 is continuously comparing the voltage V1 at junction J1 to V3. When the sum of the currents through resistors 34 and 36 equals the current through thermistor 35 and linearization resistor 38 then V1 will equal V3. Accordingly, for all values of set point temperature $T_{sp}$ which will satisfy thermistor linearization conditions i.e. where the current through thermistor 35 varies substantially linearly with the thermistor temperature $T_p$, when $T_p = T_{sp}$ the voltage V1 will be the same i.e. V1=V3. When the temperature $T_p$ of the thermistor 35 is less than $T_{sp}$ the voltage V1 at junction J1 will be more than the reference threshold voltage V3. Similarily, when the temperature $T_p$ of thermistor 35 equals the set point temperature minus 5° F. i.e. $T_{sp-5}$ the voltage V1 at junction J1 will substantially equal the reference threshold voltage V2 for comparator 40. Again, since the reference threshold voltage V2 is substantially constant, comparator 40 is continuously comparing the voltage V1 at junction J1 to V2. When the temperature $T_p$ of the thermistor 35 is less than $T_{sp-5}$, the voltage V1 at junction J1 will be more than the reference threshold voltage V2. Due to the fact that linearization of thermistor 35 was established for temperatures where $T_p=T_{sp}$ thermistor linearization is not completely accurate for temperatures $T_{sp-5}$. This error may be eliminated by utilizing a current to voltage converter, i.e. an operational amplifier to fix the voltage across thermistor 35 resulting in a voltage V1 which would vary linearly with temperature $T_p$. However; the error associated with variable temperature sensing circuit 30 as illustrated is relatively small in most instances.

Referring again to FIG. 1a, for thermistor 35 temperatures $T_p$ which are less than $T_{sp-5}$ (V1<V2), the outputs 41 and 51 of comparators 40 and 50 will both be logical zero (0). For thermistor 35 temperatures $T_p$ which are substantially equal to or greater than $T_{sp-5}$ but less than the set point temperature $T_{sp}$ the voltage V1 will be substantially equal to or less than reference threshold voltage V2; accordingly, the output 41 of comparator 40 will be a logical one (1) while the output 51 of comparator 50 will remain a logical zero (0). For thermistor 35 temperatures $T_p$ which are substantially equal to or greater than the set point temperature $T_{sp}$ the voltage V1 will be substantially equal to or less than both of the reference threshold voltages V2 and V3; accordingly, both outputs 41 and 51 of compartors 40 and 50 will be logical one (1). These various states of the outputs 41 and 51 of comparators 40 and 50 respectively which also represent the outputs of variable temperature sensing circuit 30 may be utilized to activate and deactivate various functions and/or circuits as will be further exemplified in the preferred embodiment of variable power and temperature control system 1.

After reading the description of the thermistor linearization scheme utilized in variable temperature sensing circuit 30, it will be understood by those skilled in the art that while sensing circuit 30 as shown in FIG. 1a is capable of detecting two temperatures for one setting of the potentiometer 32 i.e. temperatures $T_{sp}$ and $T_{sp-5}$, in its simplest embodiment variable temperature sensing circuit 30 may be utilized to detect only one temperature $T_{sp}$ by removing comparator 40, resistors 42, 44, and 46, and capacitor 45 from the circuit 30. A simplified embodiment of variable temperature sensing circuit 30 is disclosed by Walter R. Spofford in his U.S. Pat. No. 4,148,220, entitled "Linearization Means And Method For A Thermistor Temperature Sensing System."

Continuing to refer to FIG. 1a, variable power and temperature control circuit 110 further includes a means 60 responsive to variable temperature sensing circuit 30 for indicating the detection of set point temperature $T_{sp}$ and where desirable 5° F. below the set point temperature $T_{sp-5}$ by variable temperature sensing circuit 30. As illustrated in FIG. 1a, the preferred embodiment of indicating means 60 utilizes a light emitting diode 76 to signal each of the temperatures sensed and detected by sensing circuit 30. Further included in indicating means 60 is a conventional comparator 70 of the type previously described, which may be one of the four comparators forming a part of the quad comparator integrated circuit package, having a negative and positive input again denoted by a minus (−) sign and plus (+) sign respectively, an output 71, and a reference threshold voltage V4 appearing at a junction J4 which is determined by the output 51 of comparator 50 of temperature sensing circuit 30. Indicating means 60 also includes a bipolar semiconductor switching device 74 which in the preferred embodiment is an NPN transistor having its collector electrically coupled through a biasing resistor 114 to D.C. power supply 9, its emitter electrically coupled to the anode of light emitting diode 76, and its base electrically coupled through a resistor 72 to the output 71 of comparator 70 and to the anode of a diode 65. The cathode of diode 65 is electrically coupled to the output 41 of comparator 40 of sensing circuit 30. A voltage divider network including resistors 62 and 68, joined in series by junction J4; in combination with capacitor 75 having one side electrically coupled to the negative input of comparator 70; resistors 61, 64, 66, 72, and 78; and comparator 70 form a free running square wave oscillator 63 when the temperature $T_p$ of thermistor 35 is less than the set point temperature $T_{sp}$ which is determined by selecting means 37 i.e. $T_p < T_{sp}$. In general when $T_p < T_{sp}$ positive feedback from the output 71 of comparator 70 through resistor 61 alters the reference threshold voltage V4 appearing at the positive input of comparator 70. Resistor 78 alternately charges and discharges capacitor 75 until the voltage of capacitor 75 crosses the reference threshold voltage V4 at which time the comparator 70 will change its state. Resistor 66 having one side electrically coupled to the positive input of comparator 70 and the other side electrically coupled to junction J4 compensates for bias current variations of comparator 70.

When the temperature $T_p$ of the thermistor 35 is less than the set point temperature $T_{sp}$ but greater than the set point temperature minus 5° F. $T_{sp-5}$ i.e. $T_{sp-5} < T_p < T_{sp}$, the oscillating output 71 of comparator 70 is buffered and activates bipolar semiconductor switching device 74. The current through switching device 74 is limited by resistor 114 resulting in its saturation. Accordingly, light emitting diode 76 is driven by the oscillating output 71 of comparator 70 and flashes on and off repetitively.

When the temperature $T_p$ of the thermistor 35 is less than the set point temperature $T_{sp}$ minus 5° F. $T_{sp-5}$ i.e. $T_p < T_{sp-5}$, bipolar semiconductor switching device 74 is off, since the base drive to switching device 74 is removed by diode 65. Accordingly, with switching device 74 off the light emitting diode 76 is also off.

When the set point temperature $T_{sp}$ is less than the temperature $T_p$ of thermistor 35 i.e. $T_{sp} < T_p$, the output 71 of comparator 70 ceases oscillating but switching device 74 is left on. In this state the voltage appearing at the positive input of comparator 70 is greater than the voltage at output 71 of comparator 70 thereby quenching oscillation. The light emitting diode 76 is now constantly on since switching device 74 provides a constant drive.

Referring now to FIG. 1b our variable power and temperature control circuit 110 also includes a variable power source 80 responsive to variable temperature sensing circuit 30 and peak detector 20 having means 107 for selecting a plurality of power levels to drive load 3 each of which is defined by averaging the level of an oscillating signal having a constant twelve (12) second period. Forming the basis for our pulse-width controlled variable power source 80 is a unique oscillator circuit 80′ which includes a capacitor 82; resistors 81, 83–89, 99 and 100; diodes 96–98; a potentiometer 108; bilateral semiconductor switching devices 93–95 each having a digital input a which controls a bilateral signal transmission path between terminals b and c; and a comparator 90 having a positive input denoted by a plus (+) sign, a negative input denoted by a minus (−) sign, and an output 91. It should be noted that while switching device 93 is of the type described hereinaove, it in fact functions as a digital inverting gate and therefore could be replaced by any conventional digital inverting logic gate. Further included within variable power source 80 is another bilateral semiconductor switching device 92 of the type described hereinaove which in conjunction with peak detector 20 assures that the power supplied by variable power source 80 to load 3 is applied at substantially the crest of a half-cycle waveform of the A.C. line voltage.

Bilateral semiconductor switching devices 92, 94 and 95 may include any conventional switches capable of controlling or switching analog signals. In the preferred embodiment illustrated in FIG. 1b each switching device 92–95 is a transmission gate. When a logical one (1) signal is applied to the digital input a, the transmission gate closes thereby transmitting the analog signal between terminals b and c. As long as a logical zero (0) signal is applied to the digital input a the transmission gate remains open. We have found it advantageous to use a quad-bilateral switch integrated circuit package which for example may be of the MC 14016 type manufactured by Motorola Semiconductor Products, Inc., of Phoenix, Arizona. Furthermore, the comparator 90 may be any conventional comparator and advantageously would be included along with comparators 40, 50, and 70 in the quad comparator integrated circuit package as previously described.

As illustrated in FIG. 1b the digital inputs a of bilateral semiconductor switching devices 93 and 95 are electrically coupled to the output 51 of comparator 50 and are therefore responsive to the state of comparator 50. The digital input a of switching device 94 is electrically coupled to terminal c of switching device 93 and is therefore responsive to the state of switching device 93. The digital input a of switching device 92 is electrically coupled to the collector of bipolar semiconductor switching device 28 of peak detector 20 and is therefore responsive to peak detector 20. Comparator 90 has its positive input electrically coupled to a voltage divider network at a junction J5 thereby establishing a reference threshold voltage V5. The voltage divider network includes resistors 81 and 99 serially connected at junction J5. Resistor 83 which is electrically coupled across the terminals b and c of switching device 92 provides positive feedback. Accordingly, resistor 83 in conjunction with switching device 92 and peak detector 20 control the value of reference threshold voltage V5. The negative input of comparator 90 is electrically coupled to capacitor 82 and to the terminals of switching devices 94 and 95. The terminal b of switching device 94 is electrically coupled through the wiper 109 of potentiometer 108 to the parallel combination of resistor 86 electrically coupled in series to the cathode of diode 96 and resistor 87 electrically coupled in series to the anode of diode 97. The terminal b of switching device 95 is electrically coupled to the parallel combination of resistor 88 and resistor 89 electrically coupled in series to the cathode of diode 98. The anodes of diodes 96 and 98 and the cathode of diode 97 are commonly electrically coupled to the output 91 of comparator 90 and in series with resistors 84 and 85. The output 91 of comparator 90 which represents the output of oscillator circuit 80′ is electrically coupled through resistor 100 to the base of a bipolar semiconductor switching device 120 which in the preferred embodiment is an NPN transistor to drive a light emitting diode 122. The emitter of switching device 120 is electrically coupled to the anode of diode 122 and its collector is electrically coupled to a resistor 118 which causes switching device 120 to saturate when activated by variable power source 80 thereby limiting the current applied to diode 122. Light emitting diode 122 in combination with a bipolar semiconductor switching device 130 which in the preferred embodiment is an NPN photo transistor provides the necessary output to drive load 3 when diode 122 is sufficiently activated to turn-on transistor 130. Accordingly, load 3 will be activated whenever transistor 130 is energized. Light emitting diode 122 and transistor 130 may conveniently comprise an OPTO-COUPLER integrated circuit package of the type (TIL 112) produced by Texas Instruments, Inc., Dallas, Texas.

In order to achieve a 100% power level i.e. where load 3 is continuously on, a conventional one-shot monostable multi-vibrator circuit 101 responsive to variable power source 80 is electrically coupled to the base of switching device 120 so that switching device 120 is constantly on. Multi-vibrator circuit 101 includes a bipolar semiconductor switching device 102 which in the preferred embodiment is an NPN transistor having its base electrically coupled to a capacitor 106 and a resistor 105, its collector electrically coupled to a resistor 104 and to the anode of a diode 103, and its emitter electrically coupled to center tap 5 of A.C. low voltage transformer T. Capacitor 106 and resistor 105 in combination with resistors 84 and 85 of variable power source 80 serve to establish an RC time constant which controls the collector pulse width of switching device 102. The cathode of diode 103 is electrically coupled to the base of switching device 120 thereby allowing multi-vibrator circuit 101 to maintain switching device 120 in a continuous or state wherein variable power source 80 has been set for 100% power level.

Referring again to FIGS. 1a and 1b, variable power and temperature control system 1 further includes a TRIAC drive circuit 140 which is responsive to variable power and temperature control circuit 110. TRIAC drive circuit 140 activates and deactivates load 3 in response to the energizing and deenergizing of bipolar semiconductor switching device 130 and further controls D.C. current flow in the gate of a TRIAC 150 utilized to activate and deactivate load 3.

The source of A.C. power is rectified and filtered to provide a substantially D.C. voltage to TRIAC drive circuit 140 by resistor 14, diode 16, and capacitor 18 (FIG. 1b). Bipolar semiconductor switching device 130 has its collector electrically coupled to line L2 of control system 1, its emitter electrically coupled to the aforementioned D.C. voltage of control system 1 through a resistor 124 and to TRIAC drive circuit 140, and its base electrically coupled to its emitter through a resistor 126.

TRIAC drive circuit 140 includes a bipolar semiconductor switching device 144 which in the preferred embodiment is a PNP transistor having its base electrically coupled to the emitter of bipolar semiconductor switching device 130, its emitter electrically coupled to line L2, and its collector electrically coupled to the aforementioned D.C. voltage of control system 1 through a resistor 142 and to the gate G1 of a TRIAC 148. Main terminal two MT2 of TRIAC 148 is electrically coupled to load 3 through a resistor 146 and its main terminal one MT1 is electrically coupled to the gate G2 of another TRIAC 150. Main terminal two MT2' of TRIAC 150 is electrically coupled to load 3 and its main terminal one MT1' is electrically coupled to line L2. An RC series network which includes resistor 152 and capacitor 154 is electrically coupled across the main terminals of TRIAC 150 to filter any voltage spikes produced by the inductance of load 3.

In general, application of sufficient current to the gate of a TRIAC will activate the TRIAC thereby allowing a current to pass between its main terminals. Removal of the gate current will deactivate the TRIAC but only if the main terminal current drops below an established current value which maintains the TRIAC in an active state. Accordingly, TRIAC drive circuit 140 in conjunction with bipolar semiconductor switching device 130 operate as described hereinafter.

When switching device 130 is energized by variable power and temperature control circuit 110, switching device 144 is biased in an off state due to saturation of switching device 130. While switching device 144 is off, D.C. current flows through resistor 142 to the gate G1 of TRIAC 148 which requires a low gate current for it to be activated. TRIAC 148 is activated, thereby allowing a current to flow through load 3 and resistor 146 to the gate G2 of TRIAC 150. The gate current applied to TRIAC 150 activates TRIAC 150 thereby applying A.C. line voltage to load 3 which activates load 3 and deactivates TRIAC 148.

When switching device 130 is deactivated (or off) in response to variable power and temperature control circuit 110, switching device 144 is biased in an on state by the D.C. current flowing through resistor 124. Activated switching device 144 saturates which shunts away from the gate G1 of TRIAC 148 the D.C. current flowing through resistor 142. Accordingly, TRIAC 148 will deactivate when its main terminal current drops below the established current value needed to maintain TRIAC 148 in an active state. Switching device 144 must maintain the gate voltage of TRIAC 148 below the level where gate current would begin to flow. The operation of conventional TRIAC drive circuits utilizes a switch in series with a source of D.C. current and the gate of the TRIAC which switches on or off the gate current. By shunting the gate current, our TRIAC drive circuit is less complicated and requires fewer components. TRIAC drive circuit 140 maintains a relatively constant load on capacitor 18. If the load on capacitor 18 were removed, as would occur in conventional TRIAC drive circuits, the D.C. voltage at capacitor 18 would rise to the peak of the A.C. line voltage unless some clamping device such as a zener diode is placed in the circuit. The necessity for such additional components is eliminated by our TRIAC drive circuit 140.

Having described a preferred embodiment of our variable power and temperature control system 1 and the operation of at least that portion of the system 1 not included in our variable power and control circuit 110 the operation of variable power and temperature control circuit 110 will now be described. The theory of operation, hereinafter described, is that which is at present believed properly applicable to the embodiment described aove, but it is not intended to be limiting in nature.

In general, since our variable power and temperature control system 1 operates independent of time and allows for independent selection of power and temperature, its performance is better than conventional circuits and by its nature energy is conserved. When adapted as described above to control a microwaven oven, a user of the oven may select a desired power level from a plurality of power levels at which a material load such as food is to be heated and may also independently select a desired temperature from a plurality of temperatures up to which the food is to be heated in order for it to be cooked as desired. When the temperature of the food substantially equals the desired temperature minus 5° F. a light emitting indicator will continuously flash on and off until the temperature of the food substantially equals the desired temperature, at which point the light emitting indicator will remain constantly on. Furthermore, when the temperature of the food substantially equals the desired temperature the control system 1 will automatically reduce the power level of the oven to a minimum value for maintaining the food warm until the user desires to remove the food or otherwise reprogram the oven.

Referring to FIGS. 1a and 1b, in the operation of variable power and control circuit 110 a desired set point temperature $T_{sp}$ up to which a material load such as food is to be heated is selected by the user of the appliance by varying selecting means 37 of variable temperature sensing circuit 30. The temperature of the food is sensed by a thermistor sensor 35 which is placed in proximity to the food (usually in the center) such that the temperature $T_p$ of the thermistor sensor 35 substantially reflects the temperature of the food. At the same time that $T_{sp}$ is being selected, a power level at which the food is to be cooked is selected by the user of the appliance by varying another selecting means 107 of variable power source 80. When A.C. line power is supplied to variable power and temperature control circuit 110 through A.C. low voltage power supply 7 the temperature $T_p$ of the thermistor 35 and the set point temperature $T_{sp}$ will determine the following three unique states of control circuit 110:

such switching devices to be open. At the same time bilateral switching device 94 has a signal being supplied to its digital input a through resistor 116 which causes such switching device to be closed. In this state, capacitor 83 discharges through switching device 94, the lower portion 108a of potentiometer 108, resistor 87, and diode 97. The discharge of capacitor 82 will occur for a time proportional to the RC time constant established by capacitor 82, resistor 87 and the lower portion 108a of potentiometer 108. Capacitor 82 will charge through diode 96, resistor 86, and the upper portion 108b of potentiometer 108 for a time proportional to the RC time constant established by resistor 86, the upper portion 108b of potentiometer 108, and capacitor 82. As can be seen, the total period of the oscillator circuit 80' is proportional to the RC time constants established by capacitor 82, resistor 86, resistor 87 and potentiometer 108. Therefore by varying the position of wiper 109, the ratio of capacitor 82 charge time to discharge time can be varied. The minimum ratio which is available by varying wiper 109 will provide a minimum duty cycle or power level of 30%. The maximum ratio will provide a duty cycle or power level of substantially 100%. The reference threshold voltage V5 appearing at junction J5 for comparator 90 is controlled by resistors 81 83 and 99 and bilateral switching device 92. As illustrated, the digital input a of bilateral switching device 92 is electrically coupled to peak detector circuit 20. (FIG. 1a). Until a negative going pulse occurs at the collector of switching device 28 of peak detector 20, bilateral switching device 92 is closed; however, when a negative going pulse does occur at the collector of switching device 28 i.e. the crest of a half-cycle A.C. waveform the pulse is applied to the digital input a of switching

| State | Output 41 of Comparator 40 | Output 51 of Comparator 50 | LED 76 | Variable Power source 80 |
|---|---|---|---|---|
| $T_p < T_{sp\text{-}5}$ | Logical zero (0) | Logical zero (0) | Off | Cook |
| $T_{sp\text{-}5} < T_p < T_{sp}$ | Logical one (1) | Logical zero (0) | Flashing | Cook |
| $T_{sp} < T_p$ | Logical one (1) | Logical one (1) | On | Warm |

The operation of variable power and temperature control circuit 110 will therefore be described for each of these unique states.

Until the temperature $T_p$ of thermistor 35 equals the set point temperature minus 5° F. i.e. $T_{sp\text{-}5}$, the voltage V1 at junction J1 will be less than the reference threshold voltage V2 and V3 of comparators 40 and 50 respectively. Accordingly for $T_p$ less than $T_{sp\text{-}5}$ the outputs 41 and 51 of comparators 40 and 50 respectively will each be logical zero (0) as indicated in the above state table. Referring to FIG. 1a and the embodiment of indicating means 60, when $T_p$ is less than $T_{sp\text{-}5}$ oscillator 63 is free running; however, base drive to switching device 74 is removed by diode 65 due to the states of comparators 41 and 51 of variable temperature sensing circuit 30. As a result of the base drive to switching device 74 being removed, the light emitting diode 76 is off.

Referring now to FIG. 1b and the embodiment of variable power source 80, since the only output of variable temperature sensing circuit 30 (FIG. 1a) which is electrically coupled to variable power source 80 is the output 51 of comparator 50, power source 80 only changes states from cook to warm when the thermistor 35 temperature $T_p$ is equal to or greater than the set point temperature $T_{sp}$. Accordingly, for $T_p$ less than $T_{sp}$ a logical zero (0) signal is applied to the digital inputs a of bilateral switching devices 93 and 95 causing each of device 92 which for a brief moment opens switching device 92. If switching device 92 is closed when the voltage charge on capacitor 82 crosses the reference threshold voltage V5 the voltage of capacitor 82 will not change fast enough to cross the reference threshold voltage V5 by the next time that a half-cycle peak occurs; therefore, oscillator 80' is prevented from switching unless switching device 92 is open. Once the voltage of capacitor 82 crosses the reference threshold voltage V5 near the crest of the half-cycle A.C. voltage waveform the output 91 of comparator 90 will drive switching device 120 which in turn will saturate and energize light emitting diode 122. Once light emitting diode 122 has been energized the TRIAC drive circuit 140 will activate load 3. Accordingly, load 3 is initially activated only at the peak of the A.C. line voltage waveform.

When the temperature $T_p$ of thermistor 35 equals the set point temperature minus 5° i.e. $T_{sp\text{-}5}$, then the voltage V1 appearing at junction J1 will equal the reference threshold voltage V2 of comparator 40 but will be less than reference threshold voltage V3. A logical one (1) will appear at output 41 of comparator 40 and the output 51 of comparator 50 will remain the same at logical zero (0). Since the output 51 of comparator 50 has not changed, there will be no change in the operation of variable power source 80 when $T_p$ is between $T_{sp}$-5 and $T_{sp}$.

Referring again to the embodiment of indicating means 60, when the output 41 of comparator 40 is a logical one (1) the output 71 of comparator 70 is buffered by switching device 74. The current through switching device 74 is limited by resistor 114 thereby causing switching device 74 to saturate when activated. During this state the light emitting diode 76 flashes on and off.

When the temperature $T_p$ of thermistor 35 equals the set point temperaure $T_{sp}$, the voltage V1 appearing at junction J1 will equal the reference threshold voltage V3 of comparator 50 and will be greater than the reference threshold voltage V2 of comparator 40. Accordingly, for $T_{sp}$ less than $T_p$ both of the outputs 41 and 51 comparators of 40 and 50 respectively will be logical one (1). In this stable state, the reference threshold voltage V4 appearing at junction J4 in indicating means 60 will be greater than the voltage at the output 71 of comparator 70 thereby resulting in a quenching of oscillations in the oscillator 63 of indicating means 60. However, switching device 74 remains on and therefore the light emitting diode 76 remains constantly on.

Since the state of the output 51 of comparator 50 has now changed from a logical zero (0) to a logical one (1) a resulting change will occur in variable power source 80 for $T_{sp} < T_p$. The logical one (1) will be applied to the digital inputs a of bilateral switching devices 93 and 95 thereby closing such switching devices. The closing of switching device 93 will result in a signal being applied to the digital input a of bilateral switching device 94 which will cause such switching device to open. In this state capacitor 82 discharges through bilateral switching device 95 and resistor 88 and charges through bilateral switching device 95, resistor 89, and diode 98. Since the resistance values of resistors 89 and 88 are fixed, the charging and discharging of capacitor 82 through such resistors will provide a duty cycle or power level of substantially 35%. Accordingly, when the temperature $T_p$ of the thermistor 35 reaches the set point temperature $T_{sp}$, the power level applied to load 3 by variable power source 80 will be reduced automatically to a level of 35% which will keep warm the food placed in the microwave oven. As long as $T_{sp} < T_p$ variable power source 80 will maintain a warm state; however, as soon as $T_p < T_{sp}$ the power level selected by the user will be reapplied to load 3. In this manner, variable power source 80 continues to change from a cook state to a warm state and vice versa until the user removes the food or otherwise reprograms the control circuit 110.

Variable power source 80 can in fact only provide a maximum 99% power load or duty cycle. In order to achieve a desired 100% duty cycle the one-shot monostable multi-vibrator 101 has been included in our variable power and temperature control circuit 110. Previous means which have been utilized to provide this additional 1% to achieve a 100% power level have included the use of more expensive potentiometers with switch contacts which operate when a 100% power level is selected. By utilizing our present method of achieving 100% power less expensive components may be utilized. In addition, the oven user is offered a control means which is more continuous in appearance than one with a switch detent within the control rotation span.

In operation, multi-vibrator 101 provides a pulse which keeps switching device 120 on for a short time after the output 91 of comparator 90 first changes to a logical zero (0) state thereby maintaining switching device 120 constantly on when selecting means 107 has been set at a 100% power level setting. At all power level settings of selecting means 107 the one-shot pulse provided by multi-vibrator 101 will add to the normal "on time" signal provided by oscillator 80' an approximate 1% shift in the duty cycle or power level. Accordingly, for a 100% power level setting, oscillator 80' will provide a duty cycle or power level of 99% and the remaining 1% will be provided by multi-vibrator 101. For the minimum duty cycle or power level of 30% the oscillator circuit 80' will provide 29% and the multi-vibrator 101 will provide 1%. Furthermore, when variable power source 80 is in a warm state, the multi-vibrator 101 will add an additional 1% to the 35% power level provided by oscillator 80' yielding a warm power level of substantially 36% of full power.

In view of the above description it will be seen that the several objects of the invention are achieved and other advantageous results attained and that further modifications can be made without departing from the spirit and scope of the invention as defined in the appended claims.

What we claim is:

1. An oscillator circuit having a variable duty cycle for controlling the power level of a microwave oven, comprising:
   a voltage comparator;
   an adjustable RC time constant circuit including a capacitance branch and a resistance branch and first coupling means therebetween also connected to one input of said comparator;
   a reference voltage source coupled to another input of said comparator;
   second coupling means for coupling the output of said comparator to said RC time constant circuit for causing the charging and discharging of said capacitance branch in response to said comparator output and thereby the oscillation of said output;
   means for controlling the heating power of a microwave oven in response to the duty cycle of said comparator output oscillations;
   said resistance branch including a pair of alternately selectable current paths for the charging and discharging of said capacitance branch;
   said first coupling means including semiconductor switch means for selecting and coupling either of said current paths to said capacitance branch for changing the charging and discharging of said capacitance branch in accordance with the selected current path; and
   one of said current paths including a pair of parallel connected portions with each of said parallel portions having a diode connected therein for controlling the direction of current flow, said diodes being connected with opposite respective polarities for allowing current flow only in opposite directions in the respective portions, said one current path further including a potentiometer having a pair of fixed terminals each of which is connected to a separate said portion and a variable wiper terminal connected to said first coupling means for simultaneously inversely varying the resistance in said parallel portions, said potentiometer thereby providing for variation of the cooking power of said microwave oven by control of the duty cycle of said comparator output.

2. The oscillator circuit of claim 1, wherein said potentiometer is adjustable to cause variation of the duty cycle of said comparator output between 35 and 99 percent.

3. The oscillator circuit of claim 2, further comprising a monostable multivibrator means for extending said duty cycle of said comparator output by one percent.

4. The oscillator circuit of claim 1, wherein said other current path includes a second pair of parallel connected portions with one of said second pair portions including a diode for permitting current flow only in one direction therethrough.

5. The oscillator circuit of claim 4, wherein said other current path corresponds to a fixed level, low heat operating mode of said microwave oven and said one current path corresponds to a variable level, high heat operating mode of said microwave oven.

* * * * *